US012714960B2

(12) United States Patent
Maskrot et al.

(10) Patent No.: US 12,714,960 B2
(45) Date of Patent: Aug. 25, 2026

(54) METHOD FOR MANUFACTURING A METALLIC FUNCTIONAL PART DELIMITING A POROUS FILTERING MEDIUM, USING AN ADDITIVE MANUFACTURING METHOD, AND OBTAINED FUNCTIONAL PART

(71) Applicant: COMMISSARIAT À L'ENERGIE ATOMIQUE ET AUX ENERGIES ALTERNATIVES, Paris (FR)

(72) Inventors: Hicham Maskrot, Monthléry (FR); Olivier Hercher, Fontenay-les-Briis (FR); Frédéric Schuster, Germain en Laye (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 762 days.

(21) Appl. No.: 17/566,078

(22) Filed: Dec. 30, 2021

(65) Prior Publication Data

US 2022/0203281 A1 Jun. 30, 2022

(30) Foreign Application Priority Data

Dec. 30, 2020 (FR) ..................................... 20/14263

(51) Int. Cl.
*B01D 46/00* (2022.01)
*A41D 13/11* (2006.01)
(Continued)

(52) U.S. Cl.
CPC .......... *B01D 46/0001* (2013.01); *A41D 13/11* (2013.01); *A62B 23/025* (2013.01);
(Continued)

(58) Field of Classification Search
CPC ............ B01D 46/0001; B01D 39/2034; B01D 2239/065; B01D 2239/10;
(Continued)

(56) References Cited

U.S. PATENT DOCUMENTS 11,031,161 B2 * 6/2021 Sachdev ................. B22F 10/50
2009/0047439 A1 * 2/2009 Withers ................. B22F 10/38 118/620

(Continued)

FOREIGN PATENT DOCUMENTS

CN 105041529 A 11/2015
CN 109414633 A 3/2019

(Continued)

OTHER PUBLICATIONS

Du Plessis, Anton. Effects of process parameters on porosity in laser powder bed fusion revealed by X-ray tomography. Science Direct, vol. 30, Dec. 2019 [online], [retrieved on Jul. 24, 2024]. Retrieved from the Internet <URL: https://www.sciencedirect.com/science/article/pii/S2214860419306979 (Year: 2019).*

(Continued)

*Primary Examiner* — Alireza Nia
*Assistant Examiner* — Gina Mccarthy
(74) *Attorney, Agent, or Firm* — Oliff PLC

(57) ABSTRACT

A manufacturing method enabling the obtainment of a functional part essentially formed in a metallic material, all or part of the functional part delimiting a filtering medium permeable to a fluid and delimiting first and second main faces for a preferred circulation of the gas through the filtering medium. The method includes a main phase consisting of an additive manufacturing method in successive passes from a support tray. Each pass includes the deposition of at least one layer of the metallic material, the deposited material adhering to the metallic material deposited before.

(Continued)

The deposition is controlled at each pass so the stack of metallic material constitutes the functional part. The filtering medium includes a coalescent network of connecting strands interconnected according to a three-dimensional spatial distribution between the faces, the connecting strands of the network delimiting therebetween pores spatially distributed within the filtering medium in three dimensions between the faces.

19 Claims, 8 Drawing Sheets

(51) Int. Cl.

| | |
|---|---|
| ***A62B 23/02*** | (2006.01) |
| ***B01D 39/20*** | (2006.01) |
| ***B01D 46/10*** | (2006.01) |
| ***B23K 26/062*** | (2014.01) |
| ***B23K 26/08*** | (2014.01) |
| ***B23K 26/342*** | (2014.01) |
| ***B33Y 10/00*** | (2015.01) |
| ***B33Y 80/00*** | (2015.01) |

(52) U.S. Cl.
CPC ......... *B01D 39/2048* (2013.01); *B01D 46/10* (2013.01); *B23K 26/0626* (2013.01); *B23K 26/08* (2013.01); *B23K 26/342* (2015.10); *B33Y 10/00* (2014.12); *B33Y 80/00* (2014.12); *B01D 2239/065* (2013.01); *B01D 2239/10* (2013.01); *B01D 2239/1208* (2013.01); *B01D 2239/1258* (2013.01); *B01D 2239/1291* (2013.01); *B01D 2275/10* (2013.01); *B01D 2275/202* (2013.01); *B01D 2275/30* (2013.01)

(58) Field of Classification Search
CPC .... B01D 2239/1208; B01D 2239/1291; B01D 2239/202; B01D 2239/30; B01D 46/106; A41D 13/11; A41D 13/04; A62B 23/025; B22F 3/1103; B22F 5/10; B22F 7/06; B22F 3/11; C22C 1/08
See application file for complete search history.

(56) References Cited

U.S. PATENT DOCUMENTS

| | | | | |
|---|---|---|---|---|
| 2017/0239726 | A1* | 8/2017 | Palumbo | B22F 3/11 |
| 2017/0341006 | A1* | 11/2017 | Boesner | B01D 39/18 |
| 2017/0341175 | A1* | 11/2017 | Ladewig | B33Y 80/00 |
| 2018/0236558 | A1* | 8/2018 | Garay | B33Y 80/00 |
| 2019/0126413 | A1* | 5/2019 | Bogdan, Jr. | B22F 10/28 |
| 2019/0229252 | A1* | 7/2019 | Leblanc | B22F 12/41 |
| 2019/0255654 | A1* | 8/2019 | Beckett | B23K 26/0643 |
| 2019/0299290 | A1* | 10/2019 | Kuhns | B33Y 70/00 |
| 2021/0138543 | A1* | 5/2021 | Maskrot | C22C 38/04 |
| 2021/0316170 | A1* | 10/2021 | Domoy | A62B 23/025 |
| 2023/0218533 | A1* | 7/2023 | Williams, III | B33Y 80/00 514/255.06 |

FOREIGN PATENT DOCUMENTS

| | | | |
|---|---|---|---|
| EP | 1 418 013 | A1 | 5/2004 |
| FR | 95146 | E | 7/1970 |
| WO | 2017/117527 | A1 | 7/2017 |
| WO | 2018/005315 | A1 | 1/2018 |
| WO | 2019/094300 | A1 | 5/2019 |

OTHER PUBLICATIONS

Alfaify et al., “Controlling the porosity of 316L stainless steel parts manufactured via the powder bed fusion process,” Rapid Prototyping Journal, 2019, vol. 25, No. 1, pp. 162-175.

* cited by examiner

| 50 μm layer | | | | | |
|---|---|---|---|---|---|
| No. | Power (W) | Velocity (mm/s) | HD (mm) | Thickness (mm) | Density (J/mm$^3$) |
| 1 | 96 | 700 | 0.12 | 0.05 | 22.86 |
| 2 | 83 | 700 | 0.12 | 0.05 | 19.76 |
| 3 | 69 | 700 | 0.12 | 0.05 | 16.43 |
| 4 | 55 | 700 | 0.12 | 0.05 | 13.10 |
| 5 | 55 | 770 | 0.12 | 0.05 | 11.90 |
| 6 | 55 | 840 | 0.12 | 0.05 | 10.91 |
| 7 | 275 | 700 | 0.12 | 0.05 | 65.48 |
| 8 | 275 | 700 | 0.2 | 0.05 | 39.29 |
| 9 | 275 | 700 | 0.3 | 0.05 | 26.19 |
| 10 | 275 | 700 | 0.5 | 0.05 | 15.71 |
| 11 | | | | | |
| 12 | 275 | 1000 | 0.12 | 0.05 | 45.83 |
| 13 | 275 | 1167 | 0.12 | 0.05 | 39.27 |
| 14 | 275 | 1400 | 0.12 | 0.05 | 32.74 |
| 15 | 275 | 1750 | 0.12 | 0.05 | 26.19 |
| 16 | 275 | 2334 | 0.12 | 0.05 | 19.64 |
| 17 | 275 | 3499 | 0.12 | 0.05 | 13.10 |
| 18 | 275 | 4167 | 0.12 | 0.05 | 11.00 |
| 19 | 275 | 5000 | 0.12 | 0.05 | 9.17 |
| 20 | 275 | 6000 | 0.12 | 0.05 | 7.64 |
| 21 | 275 | 7000 | 0.12 | 0.05 | 6.55 |
| 22 | 275 | 8000 | 0.12 | 0.05 | 5.73 |
| 23 | 275 | 1000 | 0.1 | 0.05 | 55.00 |
| 24 | 275 | 1167 | 0.1 | 0.05 | 47.13 |
| 25 | 275 | 1400 | 0.1 | 0.05 | 39.29 |
| 26 | 275 | 1750 | 0.1 | 0.05 | 31.43 |
| 27 | 275 | 2333 | 0.1 | 0.05 | 23.57 |
| 28 | 275 | 3501 | 0.1 | 0.05 | 15.71 |
| 29 | 275 | 5000 | 0.1 | 0.05 | 11.00 |
| 30 | 275 | 6000 | 0.1 | 0.05 | 9.17 |
| 31 | 275 | 7000 | 0.1 | 0.05 | 7.86 |
| 32 | 275 | 8000 | 0.1 | 0.05 | 6.88 |
| 33 | 275 | 9000 | 0.1 | 0.05 | 6.11 |

| 100 μm layer | | | | | |
|---|---|---|---|---|---|
| No. | Power (W) | Velocity (mm/s) | HD (mm) | Thickness (mm) | Density (J/mm$^3$) |
| 34 | 96 | 700 | 0.12 | 0.1 | 11.43 |
| 35 | 83 | 700 | 0.12 | 0.1 | 9.88 |
| 36 | 69 | 700 | 0.12 | 0.1 | 8.21 |
| 37 | 55 | 700 | 0.12 | 0.1 | 6.55 |
| 38 | 55 | 770 | 0.12 | 0.1 | 5.95 |
| 39 | 55 | 840 | 0.12 | 0.1 | 5.46 |
| 40 | 275 | 700 | 0.12 | 0.1 | 32.74 |
| 41 | 275 | 700 | 0.5 | 0.1 | 7.86 |
| 42 | 275 | 700 | 0.3 | 0.1 | 13.10 |
| 43 | 275 | 700 | 0.2 | 0.1 | 19.64 |
| 44 | 275 | 700 | 0.15 | 0.1 | 26.19 |
| 45 | 189 | 687 | 0.12 | 0.1 | 22.93 |
| 46 | 163 | 691 | 0.12 | 0.1 | 19.66 |
| 47 | 136 | 693 | 0.12 | 0.1 | 16.35 |
| 48 | 109 | 696 | 0.12 | 0.1 | 13.05 |
| 49 | 109 | 766 | 0.12 | 0.1 | 11.86 |
| 50 | 109 | 837 | 0.12 | 0.1 | 10.85 |
| 51 | 275 | 700 | 0.12 | 0.1 | 32.74 |
| 52 | 275 | 778 | 0.12 | 0.1 | 29.46 |
| 53 | 275 | 875 | 0.12 | 0.1 | 26.19 |
| 54 | 275 | 1000 | 0.12 | 0.1 | 22.92 |
| 55 | 275 | 1167 | 0.12 | 0.1 | 19.64 |
| 56 | 275 | 1260 | 0.12 | 0.1 | 18.19 |
| 57 | 275 | 1749 | 0.12 | 0.1 | 13.10 |
| 58 | 275 | 2083 | 0.12 | 0.1 | 11.00 |
| 59 | 275 | 700 | 0.1 | 0.1 | 39.29 |
| 60 | 275 | 778 | 0.1 | 0.1 | 35.35 |

| 30 μm layer | | | | | |
|---|---|---|---|---|---|
| No. | Power (W) | Velocity (mm/s) | HD (mm) | Thickness (mm) | Density (J/mm³) |
| 1 | 96 | 700 | 0.1 | 0.03 | 45.71 |
| 2 | 83 | 700 | 0.1 | 0.03 | 39.52 |
| 3 | 69 | 700 | 0.1 | 0.03 | 32.86 |
| 4 | 55 | 770 | 0.1 | 0.03 | 23.81 |
| 5 | 55 | 840 | 0.1 | 0.03 | 21.83 |
| 6 | 96 | 700 | 0.12 | 0.03 | 38.10 |
| 7 | 83 | 700 | 0.12 | 0.03 | 32.94 |
| 8 | 69 | 700 | 0.12 | 0.03 | 27.38 |
| 9 | 55 | 770 | 0.12 | 0.03 | 19.84 |
| 10 | 55 | 840 | 0.12 | 0.03 | 18.19 |
| 11 | 175 | 750 | 0.12 | 0.03 | 64.81 |
| 12 | 175 | 750 | 0.15 | 0.03 | 51.85 |
| 13 | 175 | 750 | 0.2 | 0.03 | 38.89 |
| 14 | 175 | 750 | 0.3 | 0.03 | 25.93 |
| 15 | 175 | 750 | 0.5 | 0.03 | 15.56 |
| 16 | 175 | 1167 | 0.1 | 0.03 | 49.99 |
| 17 | 175 | 1167 | 0.12 | 0.03 | 41.65 |
| 18 | 175 | 1167 | 0.12 | 0.03 | 41.65 |
| 19 | 175 | 1400 | 0.12 | 0.03 | 34.72 |
| 20 | 175 | 1750 | 0.1 | 0.03 | 33.33 |
| 21 | 175 | 1750 | 0.12 | 0.03 | 27.78 |
| 22 | 175 | 2333 | 0.1 | 0.03 | 25.00 |
| 23 | 175 | 2333 | 0.12 | 0.03 | 20.84 |
| 24 | 175 | 3501 | 0.1 | 0.03 | 16.66 |
| 25 | 175 | 3501 | 0.12 | 0.03 | 13.88 |
| 26 | 175 | 5000 | 0.1 | 0.03 | 11.67 |
| 27 | 175 | 5000 | 0.12 | 0.03 | 9.72 |
| 28 | 175 | 6000 | 0.1 | 0.03 | 9.72 |
| 29 | 175 | 6000 | 0.12 | 0.03 | 8.10 |
| 30 | 175 | 7000 | 0.1 | 0.03 | 8.33 |
| 31 | 175 | 7000 | 0.12 | 0.03 | 6.94 |
| 32 | 175 | 8000 | 0.1 | 0.03 | 7.29 |
| 33 | 175 | 8000 | 0.12 | 0.03 | 6.08 |
| 34 | 175 | 9000 | 0.1 | 0.03 | 6.48 |
| 35 | 175 | 9000 | 0.12 | 0.03 | 5.40 |
| 36 | 175 | 750 | 0.1 | 0.03 | 77.78 |
| 37 | 175 | 750 | 0.12 | 0.03 | 64.81 |

FIG. 8

| 100 μm layer | | | | | |
|---|---|---|---|---|---|
| No. | Power (W) | Velocity (mm/s) | HD (mm) | Layer (mm) | Energy density (J/mm^3) |
| HD100_1 | 300 | 4615 | 0.1 | 0.05 | 13.00 |
| HD100_2 | 325 | 5000 | 0.1 | 0.05 | 13.00 |
| HD100_3 | 350 | 5385 | 0.1 | 0.05 | 13.00 |
| HD100_4 | 375 | 5796 | 0.1 | 0.05 | 12.94 |
| HD100_5 | 275 | 5769 | 0.1 | 0.05 | 9.53 |
| HD100_6 | 275 | 6500 | 0.1 | 0.05 | 8.46 |
| HD100_7 | 300 | 5217 | 0.1 | 0.05 | 11.50 |
| HD100_8 | 325 | 5652 | 0.1 | 0.05 | 11.50 |
| HD100_9 | 350 | 6087 | 0.1 | 0.05 | 11.50 |
| HD100_10 | 375 | 6522 | 0.1 | 0.05 | 11.50 |
| HD100_11 | 275 | 4783 | 0.1 | 0.05 | 11.50 |
| HD100_12 | 300 | 6000 | 0.1 | 0.05 | 10.00 |
| HD100_13 | 325 | 6500 | 0.1 | 0.05 | 10.00 |
| HD100_14 | 350 | 7000 | 0.1 | 0.05 | 10.00 |
| HD100_15 | 375 | 7500 | 0.1 | 0.05 | 10.00 |
| HD100_16 | 275 | 5500 | 0.1 | 0.05 | 10.00 |

| 120 μm layer | | | | | |
|---|---|---|---|---|---|
| No. | Power (W) | Velocity (mm/s) | HD (mm) | Layer (mm) | Energy density (J/mm^3) |
| HD100_1 | 300 | 3817 | 0.12 | 0.05 | 13.00 |
| HD100_2 | 325 | 4135 | 0.12 | 0.05 | 13.00 |
| HD100_3 | 350 | 4453 | 0.12 | 0.05 | 13.00 |
| HD100_4 | 375 | 4771 | 0.12 | 0.05 | 12.94 |
| HD100_5 | 275 | 5093 | 0.12 | 0.05 | 9.53 |
| HD100_6 | 275 | 5729 | 0.12 | 0.05 | 8.46 |
| HD100_7 | 300 | 4202 | 0.12 | 0.05 | 11.50 |
| HD100_8 | 325 | 4552 | 0.12 | 0.05 | 11.50 |
| HD100_9 | 350 | 4902 | 0.12 | 0.05 | 11.50 |
| HD100_10 | 375 | 5252 | 0.12 | 0.05 | 11.50 |
| HD100_11 | 275 | 3852 | 0.12 | 0.05 | 11.50 |
| HD100_12 | 300 | 5000 | 0.12 | 0.05 | 10.00 |
| HD100_13 | 325 | 5417 | 0.12 | 0.05 | 10.00 |
| HD100_14 | 350 | 5833 | 0.12 | 0.05 | 10.00 |
| HD100_15 | 375 | 6250 | 0.12 | 0.05 | 10.00 |
| HD100_16 | 275 | 4583 | 0.12 | 0.05 | 10.00 |

FIG. 9

| No. | Name | P (W) | V (mm/s) | HD (mm) | Density (J/mm²) | Diam and thickness (mm) |
|---|---|---|---|---|---|---|
| 1_1, 2, 3, 4 | 20-P6-SFM-1 a,b,c,d | 275 | 3501 | 0.1 | 15.71 | Φ96/0.6 |
| 2_1, 2, 3, 4 | 20-P6-SFM-2 a,b,c,d | 275 | 3501 | 0.08 | 19.64 | Φ96/0.6 |
| 3_1, 2, 3, 4 | 20-P6-SFM-3 a,b,c,d | 55 | 840 | 0.12 | 10.91 | Φ96/1 |
| 4_1, 2, 3, 4 | 20-P6-SFM-4 a,b,c,d | 275 | 3501 | 0.1 | 15.71 | Φ96/1 |
| 5_1, 2, 3, 4 | 20-P6-SFM-5 a,b,c,d | 350 | 6087 | 0.1 | 11.50 | Φ96/1 |
| 6_1, 2, 3, 4 | 20-P6-SFM-6 a,b,c,d | 350 | 6087 | 0.08 | 14.37 | Φ96/1 |
| 7_1, 2, 3, 4 | 20-P6-SFM-7 a,b,c,d | 275 | 5000 | 0.1 | 13 | Φ96/1 |

FIG. 10

| No. | Name | P (W) | V (mm/s) | HD (mm) | Density (J/mm²) | Diam and thickness (mm) |
|---|---|---|---|---|---|---|
| 1_1, 2, 3, 4 | 20-P7-SFM-1 a,b,c,d | 275 | 3501 | 0.1 | 15.71 | Φ96/0.6 |
| 2_1, 2, 3, 4 | 20-P7-SFM-2 a,b,c,d | 275 | 3501 | 0.08 | 19.64 | Φ96/0.6 |
| 3_1, 2, 3, 4 | 20-P7-SFM-3 a,b,c,d | 55 | 840 | 0.12 | 10.91 | Φ96/1 |
| 4_1, 2, 3, 4 | 20-P7-SFM-4 a,b,c,d | 275 | 3501 | 0.1 | 15.71 | Φ96/1 |
| 5_1, 2, 3, 4 | 20-P7-SFM-5 a,b,c,d | 350 | 6087 | 0.1 | 11.5 | Φ96/1 |
| 6_1, 2, 3, 4 | 20-P7-SFM-6 a,b,c,d | 350 | 6087 | 0.08 | 14.37 | Φ96/1 |
| 7_1, 2, 3, 4 | 20-P7-SFM-7 a,b,c,d | 325 | 5000 | 0.1 | 13 | Φ96/1 |
| Filter 1.5mm - 2 | 20-P7-SFM-8 a,b,c,d | 275 | 3501 | 0.1 | 15.71 | Φ96/1.5 |
| Filter 1.5mm - 2 | 20-P7-SFM-9 a,b,c,d | 350 | 6087 | 0.1 | 11.5 | Φ96/1.5 |

FIG. 11

| No. | Name | P (W) | V (mm/s) | HD (mm) | Density (J/mm²) | Diam and thickness (mm) |
|---|---|---|---|---|---|---|
| 3_1, 2, 3 | 20-P8-SFM-3 a,b,c | 55 | 840 | 0.12 | 10.91 | Φ96/1 |
| 4_1, 2, 3 | 20-P8-SFM-4 a,b,c | 275 | 3501 | 0.1 | 15.71 | Φ96/1 |
| 5_1, 2, 3 | 20-P8-SFM-5 a,b,c | 350 | 6087 | 0.1 | 11.5 | Φ96/1 |
| 6_1, 2, 3 | 20-P8-SFM-6 a,b,c | 350 | 6087 | 0.08 | 14.37 | Φ96/1 |
| 7_1, 2, 3 | 20-P8-SFM-7 a,b,c | 325 | 5000 | 0.1 | 13 | Φ96/1 |
| F1 | 20-P8-SFM-1 | 275 | 3501 | 0.2 | 7.85 | Φ96/1 |
| F2 | 20-P8-SFM-2 | 275 | 3501 | 0.2 | 7.85 | Φ96/1 |
| F3 | 20-P8-SFM-8 | 275 | 3501 | 0.12 | 13.09 | Φ96/1 |
| F4 | 20-P8-SFM-9 | 275 | 3501 | 0.12 | 13.09 | Φ96/1 |
| Mask new design | 20-P8-MFM-1 | 275 | 3501 | 0.12 | 13.09 | |
| Mask alone | 20-P8-MFM-2 | 275 | 3501 | 0.12 | 13.09 | |
| Mask M1, M2 M3, M4 | 20-P8-MFM-3, 4, 5, 6 | 275 | 3501 | 0.12 | 13.09 | |

FIG. 12

METHOD FOR MANUFACTURING A METALLIC FUNCTIONAL PART DELIMITING A POROUS FILTERING MEDIUM, USING AN ADDITIVE MANUFACTURING METHOD, AND OBTAINED FUNCTIONAL PART

TECHNICAL FIELD OF THE INVENTION

The present invention concerns a manufacturing method enabling the obtainment of a functional part essentially formed in a metallic material, all or part of the functional part delimiting a filtering medium permeable to a fluid and delimiting first and second main faces for a preferred circulation of the fluid through the filtering medium between the first and second main faces.

The invention also concerns a functional part obtained by implementing such a manufacturing method.

The invention finds application in any system where filtering of a fluid, whether this consists of a gas or a liquid, is necessary, for example for air. A possible application concerns the manufacture or the supply of masks complying with the FFP1 or FFP2 standards, and other very high efficiency filtering media. The field of application could be extended to different field of the industry and for the general public. The obtained functional part could also serve as a support for a catalyst or for the electrodes of batteries. More generally, the invention finds application in any device requiring a filtering medium with a large exchange surface, for individual or collective protection.

STATE OF THE ART

In the field of individual or collective protection, in particular to protect persons against the propagation and transmission by projection or by air of viruses, microbes, bacteria, or dust, the existence of masks worn by people is known.

It is known that almost all protective equipment such as surgical masks, FFP2 masks and general public masks are disposable.

Besides the supply problems, current protective equipment has several drawbacks.

The main drawback of general public masks, surgical or FFP2 masks, lies in their ephemeral and non-reusable nature. With a use time in the range of 3 hours, it is consequently necessary to consume considerable amounts of them, for example at least 24 million a week for the sole medical and paramedical staff in France. Of course, this poses a real ecological problem, especially in the event of a pandemic.

Moreover, the fact that the masks are discarded implies a non-negligible risk for other persons who might handle them or be more generally in contact with them.

An alternative solution consists in the use of protective masks made of a washable fabric. The drawbacks of this ephemeral nature are the substantial accumulation of soiled wastes and the potential risks related to management thereof. Moreover, it should not be forgotten that washing a large amount of masks (several millions a day) could have an environmental impact due to washing effluents.

There are already metallic filters manufactured by sintering powders, but these processes are very expensive, complex and the obtained filters have a heterogeneous porosity distribution. The obtained shapes are also limited. In addition, in practice, it turns out unfortunately that the pressure drop, to which the filtered fluid crossing the filter is subjected, increases with the filtering efficiency. Thus, obtaining a very high efficiency filter implies a pressure drop level that might turn out to be prohibitive in some applications.

OBJECT OF THE INVENTION

The present invention aims at providing a manufacturing method of the aforementioned type which allows addressing the problems listed hereinbefore in connection with the mentioned state of the art.

In particular, the invention aims at providing a solution that addresses the following objectives:

- providing filtering media having a very high durability, namely their service life and their use duration, in particular reusable over the entire lifetime,
- substantially limiting the amount of wastes, to better fit to a sustainable development view,
- providing filtering media having a high filtering efficiency,
- obtaining filtering media having a low pressure drop for the filtered fluid,
- providing filtering media capable of meeting the criteria of a mask of the FFP1 or FF2 category or of a very high efficiency filtering medium typically according to the European classification EN 1822:2009 or according to the standard EN 779:2012, in particular allowing for a filtering rate higher than 99% for particles larger than 100 nm,
- being simple and inexpensive to manufacture,
- enabling the obtainment of filtering media with complex shapes,
- allowing for a homogeneous distribution of the pores within the filtering media.

This aim could be achieved thanks to the implementation of a manufacturing method enabling the obtainment of a functional part essentially formed in a metallic material, all or part of the functional part delimiting a filtering medium permeable to a fluid and delimiting first and second main faces for a preferred circulation of said gas through the filtering medium between the first and second main faces, the manufacturing method comprising a main phase consisting of an additive manufacturing method in successive passes from a support tray, each pass comprising the deposition of at least one layer of said metallic material, the deposited material adhering to the metallic material of at least one layer deposited before, the deposition of the metallic material at the level of each layer being controlled at each pass such that the stack of the metallic material deposited during said successive passes constitutes said functional part, whose filtering medium comprises a coalescent network of connecting strands interconnected according to a three-dimensional spatial distribution between the first and second main faces, the connecting strands of said network delimiting therebetween pores spatially distributed within the filtering medium in three dimensions between the first and second main faces.

An advantage of this manufacturing method is that it is simple and economic. Moreover, it is possible to easily manufacture parts with simple or complex shapes, whether these consist of planar surfaces (disk, square, rectangle, triangle, polygonal) or of clumsy surfaces (tube, sphere, cylinder, pyramid, face masks). It is possible to easily reach a controlled porosity, that is to say with a perfect control of the architecture, of the size and of the distribution of the pores and at the same time with a perfect control of the architecture, of the length, of the thickness of the connecting strands of the metallic coalescent network. It is possible to easily obtain a filtering medium having a thickness ranging from 400 μm to 500 μm. It is possible to quite easily obtain a homogeneous distribution of the pores within the filtering medium, thereby guaranteeing good efficiency and good reliability. Unlike powder sintering solutions, it is possible to obtain a very high filtering efficiency while preserving a quite low pressure drop level. Besides the aforementioned advantages, the filtering medium manufacture in this manner is particularly advantageous thanks to its great durability, almost over the entire lifetime, and to its very low environmental impact.

Some preferred yet non-limiting aspects of this manufacturing method are as follows, these features could be considered separately or in combination.

The filtering medium obtained during the main phase is contained in a main plane forming an angle comprised between 30° and 90° with the support tray.

The thickness of the filtering medium, considered between the first and second main faces, is comprised between 400 μm and 500 mm.

The metallic material in which the functional part is essentially made comprises at least one of the following material in the pure, alloy or oxide form: aluminum, stainless steel, nickel, cobalt, iron, copper, palladium, titanium, tungsten, silver, platinum.

At each pass, the support tray is heated up to a temperature comprised between the ambient temperature and 250° C., and in particular equal to 200° C. within a 10% margin.

Each pass comprises a step of depositing at least one powder layer formed in said metallic material and then a step of selective melting of the powder deposited before through a local energy input by the action of a laser beam, the selective melting of the metallic material being controlled using a pre-established computer database, which computer database controls at each pass, by a computer program controlling a spatial displacement of the laser beam relative to the metallic material powder deposited before, at least one of the parameter selected amongst: a relative path between the laser beam and the powder deposited before, a displacement velocity corresponding to a relative velocity between the laser beam and the powder deposited before, a laser beam power, a laser beam power density.

Each powder layer has a thickness comprised between 20 μm and 100 μm.

At each selective melting step, the path followed by the laser beam comprises displacement vectors where the displacement vectors are spatially offset in pairs according to an offset value and wherein the porosity rate of the pores within the filtering medium is adjusted, for a given laser beam power and a given layer thickness, by adapting said offset value, the porosity rate increasing as the offset value increases.

The laser beam power used at each pass during the selective melting step, at the level of the filtering medium, is comprised between 30% and 90% of a laser beam power value enabling the obtainment of a non-porous block devoid of pores formed in said metallic material.

At each selective melting step, the porosity rate of the pores within the filtering medium is adjusted, for a give laser beam power and a given layer thickness, by adapting the displacement velocity, the porosity rate increasing above a lower threshold of the displacement velocity, as the displacement velocity increases.

The laser beam power is 275 W and a layer thickness is 50 μm, the lower threshold of the displacement velocity being comprised between 1500 and 6000 mm/s.

At each selective melting step, the porosity rate of the pores within the filtering medium is adjusted, for a give laser beam power and a given layer thickness, by adapting the laser beam power density, the porosity rate increasing below an upper threshold of the power density, as the laser beam power density decreases.

The laser beam power is 275 W and a layer thickness is 50 μm, the upper threshold of the power density is comprised between 7 and 20 J/mm$^3$.

At each selective melting step, the porosity rate of the pores within the filtering medium is adjusted by adapting both the laser beam power and the displacement velocity, while keeping a constant ratio, within a 20% margin, between said displacement velocity and said laser beam power, the porosity rate increasing as the laser beam power and the displacement velocity increase together.

The laser beam power density is equal to 13 J/mm$^3$, at the level of the manufacture of the filtering medium, the ratio between the displacement velocity expressed in mm/s and the laser beam power expressed in W, is comprised, at each selective melting step, between 15 and 24.

The main phase is parameterized so that the functional part derived from said main phase comprises a reinforcing contour arranged over all or part of a peripheral border of the filtering medium.

The reinforcing contour has, in the plane of the first main face and/or of the second main face, an overlap with the filtering medium, in particular an overlap having a width of 1 mm within a 10% margin.

At the level of the manufactured reinforcing contour, the porosity rate is equal to 0.

The laser beam power density is equal to 13 J/mm$^3$, and at the level of the manufacture of the reinforcing contour, the ratio between the displacement velocity expressed in mm/s and the laser beam power expressed in W, is comprised, at each selective melting step, between 2.5 and 3.5.

The main phase is parameterized so that the functional part is connected to the support plate by a support formed in the same metallic material as the functional part and obtained by the same additive manufacturing method as the functional part.

The invention also covers a functional part obtained by implementing such a manufacturing method.

Some preferred yet non-limiting aspects of this functional part are as follows, these features could be considered separately or in combination.

The network of connecting strands and the pores present in the filtering medium are such that for the fluid crossing the filtering medium in a direction from the first main face towards the second main face or in a direction from the second main face towards the first main face, the permeability is comprised between 11 and 200 $l \cdot m^{-2} \cdot s^{-1}$ for a pressure drop between the first and second main faces of 100 Pa.

At the level of the filtering medium, the porosity rate of the pores present in the filtering medium is comprised between 10% and 70%.

The filtering medium is intended to be used as a filtering mask, having a thickness, considered between the first and second main faces, comprised between 600 μm and 2 mm.

The functional part has its filtering medium having a disk-like general shape, in the form of a planar surface or a clumsy surface, said disk having a diameter comprised between 8 mm and 120 mm.

BRIEF DESCRIPTION OF THE DRAWINGS

Other aspects, aims, advantages and features of the invention will appear better upon reading the following detailed description of preferred embodiments of the latter, given as a non-limiting example, and made with reference to the appended drawings wherein:

FIG. 8 is a table presenting the setting parameters during a second test denoted test 2.

FIG. 9 is a table presenting the setting parameters during a third test denoted test 3.

FIG. 10 is a table presenting the setting parameters during a fourth test denoted test 4.

FIG. 11 is a table presenting the setting parameters during a fifth test denoted test 5.

FIG. 12 is a table presenting the setting parameters during a sixth test denoted test 6.

DETAILED DESCRIPTION

Figure 1:
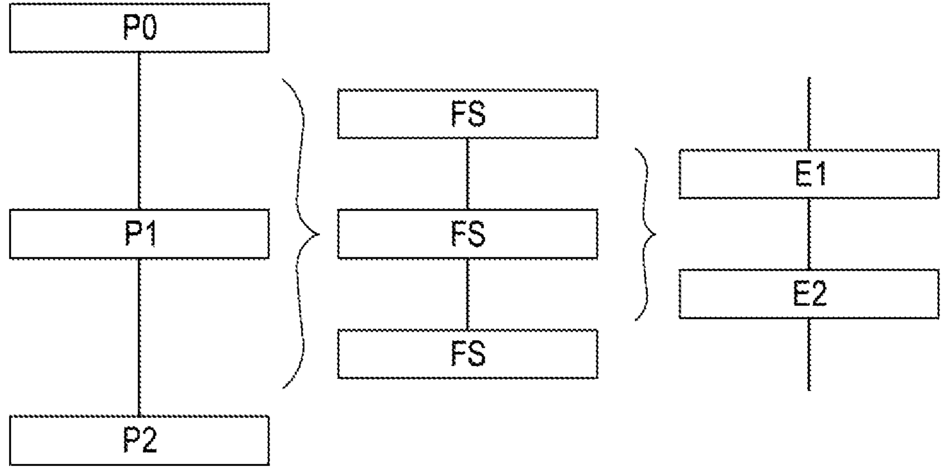
FIG. 1 is a flowchart representing different phases and steps of an example of a manufacturing method according to the invention.
Figure 2:
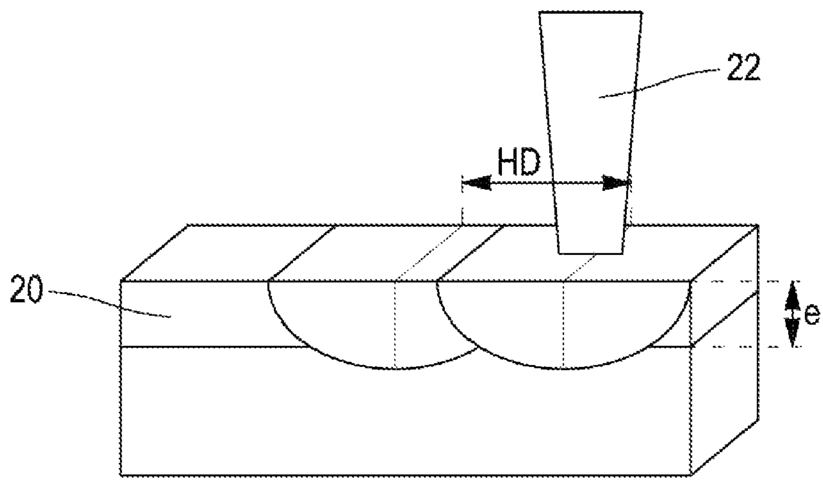
FIG. 2 schematically represents the principle of an additive method during step E2.

In the figures and in the following description, the same reference numerals represent identical or similar elements. In addition, the different elements are not represented to scale in order to enhance clarity of the figures. Moreover, the different embodiments and variants do not exclude each other and could, on the contrary, be combined together.

The invention described hereinafter aims at addressing the problems listed before in connection with the state of the art that has been presented.

In particular, a final objective has consisted in making functional parts 10 integrally manufactured in a metal, which could serve as filters and masks, and, without exclusion and to this end, aluminum could turn out to be a very interesting material to serve as a manufacturing material for its lightweight.

In general, an object of the invention first concerns a manufacturing method enabling the obtainment of a functional part 10 essentially formed in a metallic material, this manufacturing method allowing that all or part of the functional part delimits a filtering medium 12 permeable to a fluid (this fluid could be a gas and/or a liquid), allowing for an anisotropic or isotropic porosity, the filtering medium 12 delimiting a first main face 14 and a second main face 16 for a preferred circulation of this fluid through the filtering medium 12 between the first and second main faces 14, 16.

An object of the invention also concerns a functional part 10 obtained by implementing such a manufacturing method.

Advantageously, the manufacturing method comprises a main phase P1 consisting of an additive manufacturing method in successive passes FS from a support tray 18, each pass FS comprising the deposition of at least one layer of the metallic material, the metallic material deposited at the time of deposition of a given layer adhering to the metallic material of at least one layer deposited before. The deposition of the metallic material at the level of each layer is controlled at each pass FS such that the stack of the metallic material deposited during the successive passes FS constitutes the desired functional part 10, whose filtering medium 2 advantageously comprises, upon completion of the main phase P1, a coalescent network of connecting strands interconnected according to a three-dimensional spatial distribution between the first and second main faces 14, 16, the connecting strands of this network delimiting therebetween pores spatially distributed within the filtering medium 12 in three dimensions between the first and second main faces 14, 16.

Going back to the manufactured functional part 10, the network of connecting strands and the pores present in the filtering medium 12 may advantageously be such that the fluid crossing the filtering medium 12 in a direction from the first main face 14 towards the second main face 16 or in a direction from the second main face 16 towards the first main face 14, the permeability is comprised between 11 and 200 $l \cdot m^{-2} \cdot s^{-1}$ for a pressure drop between the first and second main faces 14, 16 of 100 Pa. In particular, this pressure drop depends on the thickness of the filtering medium 12, on the porosity rate and on the size of the pores.

Thus, according to a particular yet advantageous embodiment, the filtering medium 12 that is intended to be used as a filtering mask, has a thickness, considered between the first and second main faces 14, 16, which is comprised between 600 μm and 2 mm.

Hence, one of the difficulties has consisted in finding parameters of the additive method suited to obtain a functional part 10 with such a small thickness (in order to limit the pressure drop) while preserving the manufacturability and the durability, as well as the strength; which is a challenge even more difficult when targeting main faces 14, 16 that could reach between 8 and 120 mm.

According to an advantageous embodiment, each pass FS comprises a step E1 of depositing at least one powder layer 20 formed in the metallic material and then a step E2 of selective melting of the powder deposited before through a local energy input by the action of a laser beam 22, the selective melting of the metallic material being controlled using a pre-established computer database, which computer database controls at each pass, by a computer program controlling a spatial displacement of the laser beam 22 relative to the metallic material powder 20 deposited before, at least one of the parameter selected amongst:

- a relative path between the laser beam 22 and the metallic material powder 20 deposited before,
- a displacement velocity «V» corresponding to a relative velocity between the laser beam 22 and the metallic material powder 20 deposited before,
- a laser beam power «P»,
- a laser beam power density «E».

This three-dimension printing solution by successive layer depositions followed by selective melting by laser beam according to pre-established paths controlled by computer is known per se, under the technology called «SLM» which is the acronym of «Selective Laser Melting».

In a SLM additive method, it is known that the operations are carried in an environment under a neutral gas (argon in general), in particular where a metallic powder layer with a fine thickness is spread over a metallic substrate. The laser beam then brings to the powder the energy necessary to make it melt and adhere to the lower layers in a selective manner according to the geometry of the part. The repetition of these actions enables the manufacture of metallic parts with a three-dimensional complex geometry. For this purpose, it is necessary to prepare the computer-aided control type file of the part by splitting it into slices with the desired thickness of the manufacturing layer to form a set of two-dimensional planes therefrom. In addition, it is necessary to create holding supports for it and assign a parameter set that will allow defining the paths of the laser beam on the powder. All these operations allows obtaining a file that is transmitted and pilots the manufacturing machine.

The laser beam power density E, expressed in J/mm$^3$, is defined by the following mathematical formula:

$$E = \frac{P}{V.HD.e} \quad \text{[Math 1]}$$

where:

P is the laser beam power, expressed in Watt (W),

V is the displacement velocity, expressed in mm/s,

HD is an offset value between two adjacent vectors of laser application, expressed in mm, e is the layer thickness, expressed in mm, E is the laser beam power density.

Thus, at each selective melting step E2, the path followed by the laser beam 22 comprises displacement vectors where the displacement vectors are spatially offset in pairs according to the offset value HD, this value having an impact on the manufactured functional part 10.

Nevertheless, other methods for additive manufacturing of metallic material could still be considered, such as for example the so-called «SLS» technology which is the acronym of «Selective Laser Sintering», or by «Binder Jetting», or by «Electron Beam Melting», etc.

The Applicant has worked on the development of such functional parts, and has carried out a series of tests detailed hereinafter in order to determine advantageous parameters to be preferred for the particular case of the SLM additive method presented hereinbefore, which has been particularly promising, yet without this being restrictive.

It should be understood that many parameters may actually have a direct influence on the quality of manufacture of the functional part, in particular the laser beam power P, the displacement velocity V, the offset value HD between two adjacent vectors of laser application, the layer thickness e, the laser beam power density E, but also possibly a parameter known as «Beam Compensation» which is a value that compensates for the melting bath width by an offset with respect to the actual contour of the part, the parameters related to the shading strategy (with melting interruption locations and/or possibly with areas of different shading strategies and/or with rotations from one layer to another), parameters known as «Limit rotation» and «Limitation window» which depend on a limit rotation from one layer to another according to the gas flow direction, a parameter known as «Border» which defines one or several contour(s) between the edge of the part and the shading, a parameter «Fill contour» allowing defining at least one additional contour between the contour and the shading with another setting.

The metallic material in which the functional part 10 is essentially constituted comprises at least one of the following materials in the pure, alloy or oxide form: aluminum, stainless steel, nickel, cobalt, iron, copper, palladium, titanium, tungsten, silver, platinum.

Thus, as example, all tests have been carried out using a 316L stainless steel powder commercialized by SLM Solutions®. Nevertheless, the metallic material could in particular consist of aluminum or an aluminum alloy, which have the advantage of being light and thermally stable at disinfection temperatures. Else, the material could be selected in the list indicated in the previous paragraph.

The phase P0 of preparing the metallic material powder is identical for all support trays 18 of the different tests. The new powder is sieved with a 200 μm-mesh sieve to unpack the powder. Afterwards, it is steamed for a period of at least 24 h at 63° C. in order to obtain a relative humidity rate lower than 10%. Henceforth, the powder is ready to be put in the machine for the manufacture. After each manufacture, the powder is recycled by sieving it with a 50 μm sieve and by steaming it at 63° C. for more than 24 h.

Some of the tests have been carried out for the manufacture of a functional part 10 in the form of a disk whose central portion is the filtering medium 12, circular shaped too, for diameters ranging from 30 mm to 96 mm. the diameter of 96 mm corresponds to a circular filtering medium 12 suited for masks with cartridges already developed in the context of the health crisis. Other tests have been carried out so as to directly manufacture a protective mask.

More generally and beyond the context of the tests alone, the filtering medium 12 may advantageously have a disk-like general shape, in the form of a planar surface or a clumsy surface, where this disk has a diameter comprised between 8 mm and 120 mm.

In the case of a disk-like shaped filtering medium 12, it should be understood that the first and second main faces 14, 16 are then constituted by the circular faces of the disk.

Advantageously, for reasons relating to manufacturing, mechanical strength and filtering quality while limiting pressure drops, the thickness of the filtering medium 12, considered between the first and second main faces 14, 16, is comprised between 400 μm and 500 mm.

For all tests, it has been decided to favor the fact that filtering medium 12 obtained during the main phase P1 is contained within a main plane forming an angle comprised between 30° and 90° within a 5° margin with the support tray 18. This feature has the advantage of limiting the size of the heel (the heel being the portion of the functional part 10 that is in contact with the support 24 described later on), which advantageously implies a limitation of the machining necessary to separate the manufactured functional part 10 and the support 24.

For the tests, it has also been decided to work without any contour and without any scanning strategy, and to conduct them so that at each pass FS, the support tray 18 is heated up to a temperature comprised between the ambient temperature and 250° C., in particular equal to 200° C. within a 10% margin.

According to a particular embodiment, each powder layer has a thickness comprised between 20 μm and 100 μm. Thus, for all tests, a layer thickness of 50 μm been preferred, but some functional parts 10 have been manufactured using a layer thickness of 30 μm or 100 μm.

According to a particular embodiment, the main phase P1 is parameterized so that the functional part 10 is connected to the support plate 18 by a support 24 formed in the same metallic material as the functional part 10 and obtained by the same additive manufacturing method as the functional part 10. Thus, during the manufacture, the connection between the support tray 18 and each disk-like shaped functional part 10 has been made in the tests in the form of a support 24, whose characteristics will be detailed later on. This support 24 is also made with the same additive method, even though it is possible to provide for distinct manufacturing parameters between those used for the manufacture of the support 24 and those used for the manufacture of the functional part 10, in particular for the filtering medium 12.

Test 1

This test consisted in manufacturing 60 functional parts 10 in the form of a disk having a diameter of 30 mm, a thickness of 3 mm, the angle formed between the support tray 18 and each functional part being 90° within a 5° margin. The thickness e of each deposited material layer was 50 μm.

Figures 3, 4:
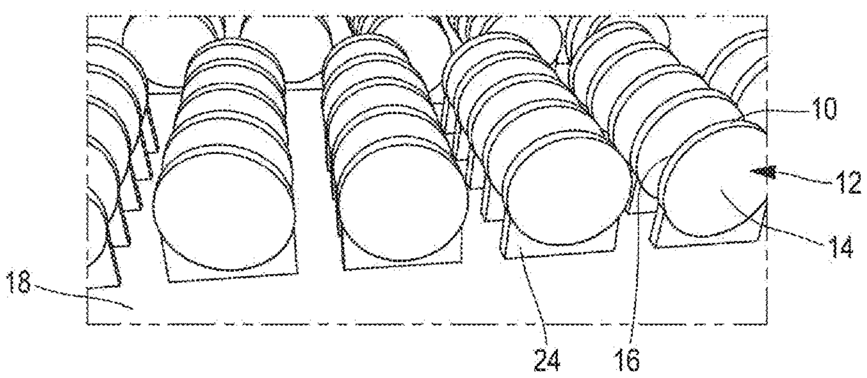
FIG. 3 represents an example of a plurality of functional parts manufactured by the manufacturing method on the support tray.
FIG. 4 is a table presenting the setting parameters during a first test denoted test 1.

FIG. 4 represents, for the 60 manufactured functional parts 10, the respective value that has been used for P, V, HD, e, E.

The «Beam Compensation» was 0.08 mm, the «Border» number was 2 for a scanning value of 100 W for a velocity of 300 mm/s, the «Fill Contour» value was 1 for a scanning value of 150 W for a velocity of 400 mm/s, the initial angle was 10° and the angle step from one layer to another was 33°, the «Limit Rotation» was activated and the «Limitation Window» was 90°, the laser beam was applied to each deposited metallic material layer, and the scanning of the laser beam at the level of the supports 24 was parameterized at a power P equal to 150 W for a displacement velocity V equal to 700 mm/s.

Consequently, for a given set laser power P, it has been possible to study the influence of the layer thickness e, the influence of HD and the influence of the increase of V.

Visually, at the exit of the manufacturing machine, there were large differences between the functional parts 10: those manufactured with very rapid velocities (above 7000 mm/s) were more brittle.

Figure 5:
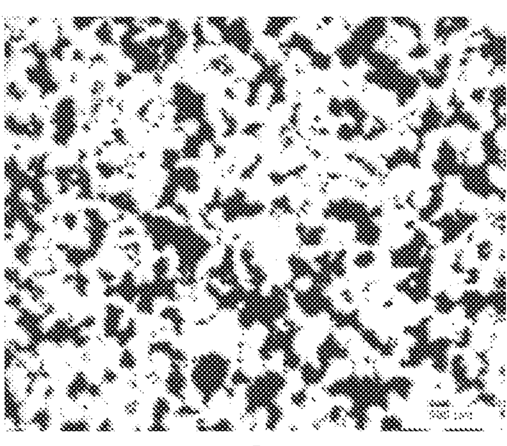
FIG. 5 illustrates an example for the functional part 10 number 17 in the table of FIG. 4.

After the removal of the manufactured functional parts 10 off the support tray 18, they have been sucked in (except for the most brittle ones), blown with compressed air and have remained for 15 minutes under ultrasounds at a temperature of 40° C. in an attempt to eliminate as much as possible powder that has not molten or has just been sintered off the functional parts 10 which could be detached easily. The filtering media 12 have then been cut, wrapped and optically inspected. FIG. 5 illustrates an example for the functional part 10 bearing the number 17 in the table of FIG. 4. It is possible to notice in the filtering medium 12 the coalescent network of connecting strands interconnected according to a three-dimensional spatial distribution, the connecting strands of the network delimiting therebetween pores that are spatially distributed within the filtering medium 12.

Figure 6:
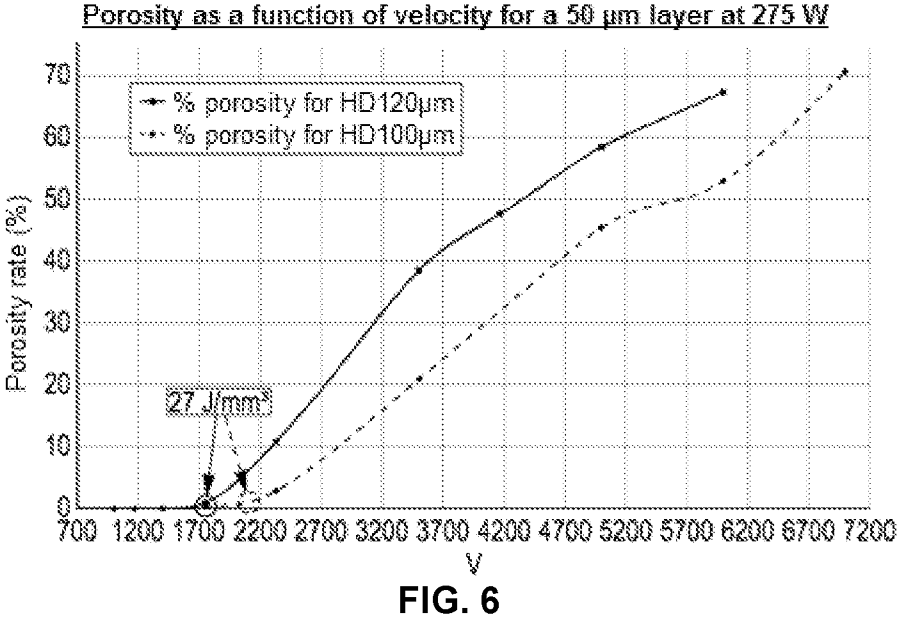
FIG. 6 represents, for the test 1, the porosity rate (in %) in ordinates, as a function of the displacement velocity V (in mm/s) in abscissas.

FIG. 6 represents the porosity rate (in %) in ordinates, as a function of the displacement velocity V (in mm/s) in abscissas. The curve located at the top corresponds to the points established for a HD value of 0.12 mm whereas the curve located at the bottom corresponds to the points established for a HD value of 0.10 mm. Thus, at each selective melting step E2, the porosity rate of the pores within the filtering medium 12 could be adjusted, for a given laser beam power P and a given layer thickness e, by adapting the displacement velocity V, the porosity rate increasing, above a lower threshold of the displacement velocity, as the displacement velocity V increases. In FIG. 6, it is shown that the laser beam power P being equal to 275 W and the layer thickness e being equal to 50 μm, the lower threshold of the displacement velocity is comprised between 1500 and 2000 mm/s. The two points surround on both curves and from which the porosity rate increases at the same time as the displacement velocity V correspond to a laser beam power density E of 27 J/mm$^3$. More generally, the lower threshold of the displacement velocity is comprised between 1500 and 6000 mm/s.

Figure 7:
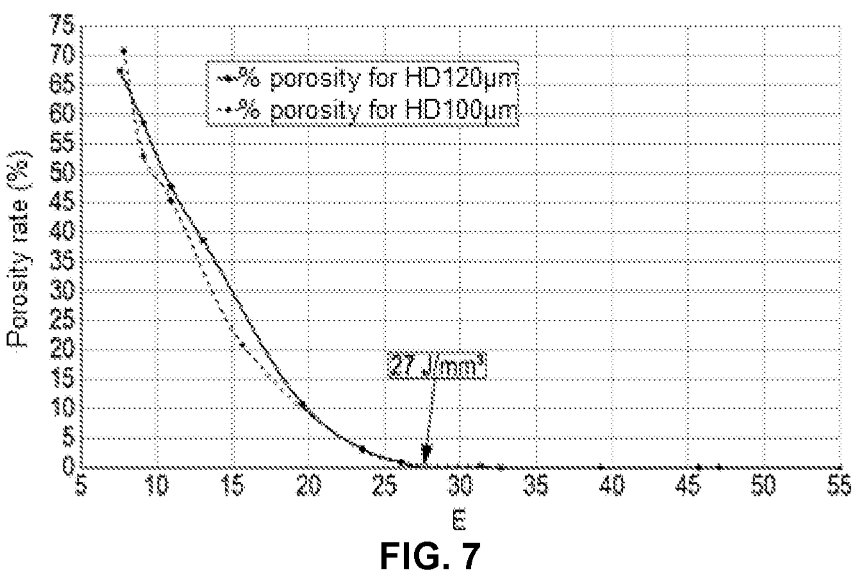
FIG. 7 represents, for the test 1, the porosity rate (in %) in ordinates, as a function of the laser beam power density E (in J/mm$^3$) in abscissas.

FIG. 7 represents the porosity rate (in %) in ordinates, as a function of the laser beam power density E (in J/mm$^3$) in abscissas. The curve located at the top corresponds to the points established for a HD value of 0.12 mm whereas the curve located at the bottom corresponds to the points established for a HD value of 0.10 mm. Thus, at each selective melting step E2, the porosity rate of the pores within the filtering medium 12 could be adjusted, for a given laser beam power P and a given layer thickness e, by adapting the laser beam power density E, the porosity rate increasing, below an upper threshold of the power density, as the laser beam power density E decreases. In FIG. 7, it is shown that the laser beam power being equal to 275 W and the thickness e being equal to 50 μm, the upper threshold of the power density is comprised between 7 and 20 J/mm$^3$. The two points surround on both curves and from which the porosity rate increases at the same time as the laser beam power density E decreases correspond to a laser beam power density E of 27 J/mm$^3$.

Finally, the test 1 has shown that for a filtering medium 12 forming an angle of 90° within a 5° margin with respect to the support tray 18, it is preferable that the laser beam power P used at each pass during the selective melting step E2, at the level of the filtering medium 12, is comprised between 30% and 90% of a laser beam power value enabling the obtainment of a non-porous block devoid of pores formed in the same metallic material. At the level of the filtering medium 12, the porosity rate of the pores present in the filtering medium 12 has then been comprised between 10% and 70%.

Test 2

This test 2 consisted in manufacturing 37 functional parts 10 in the form of a disk having a diameter of 30 mm, a thickness of 3 mm, the angle formed between the support tray 18 and each functional part being 90° within a 5° margin. The thickness e of each deposited material layer was 30 μm.

FIG. 8 represents, for the 37 manufactured functional parts 10, the respective value that has been used for P, V, HD, e, E.

The «Beam Compensation» was 0.08 mm, the «Border» number was 1 for a scanning value of 100 W for a velocity of 550 mm/s, the «Fill Contour» value was 0 for a scanning value of 150 W for a velocity of 500 mm/s, the initial angle was 10° and the angle step from one layer to another was 33°, the «Limit Rotation» was activated and the «Limitation Window» was 90°, the laser beam was applied for every 2 deposited metallic material layers (namely for each deposited slice of 60 μm), and the scanning of the laser beam at the level of the supports 24 was parameterized at a power of 200 W for a displacement velocity of 875 mm/s.

On the same support tray 18, three functional parts 10 each having directly the shape of a filtering mask ready to be worn on the head of a user, have been manufactured at the same time and by the same methods and the same settings.

Test 3

The test 3 consisted in conducting a test identical to the test 1, but while setting higher values of P, namely 300, 325, 350 and 375 W, for HD values of 100 and 120 μm. It has been sought to maintain the values of E with regards to the test 1, by adapting the values of the displacement velocity V accordingly, in particular by becoming higher than 3500 mm/s.

FIG. 9 represents, for the manufactured functional parts 10, the respective value that has been used for P, V, HD, e, E.

In the same test 3, on the same support tray 18, disk-like shaped functional parts 10 have been manufactured having a diameter of 60 mm, with a thickness of 0.6 mm, as well as a filtering mask with a 1 mm thickness with a setting of the parameters with P equal to 275 W and a displacement velocity V equal to 3501 mm/s for a HD value of 100 μm. The laser beam has been applied for every 2 deposited metallic material layers (namely for each deposited slice of 100 μm).

Thus, it has been determined, after analysis of the functional parts 10 manufactured in this manner, that at each selective melting step E2, the porosity rate of the pores within the filtering medium 12 could be adjusted by adapting both the laser beam power P and the displacement velocity V, while taking care to keep a constant ratio (within a 20% margin) between the displacement velocity V and the laser beam power P, the porosity rate increasing as the laser beam power P and the displacement velocity V increase together. This seemed to be true independently of the HD value.

In addition, for a power density E equal to 13 J/mm$^3$, at the level of the manufacture of the filtering medium 12, the ratio between the displacement velocity V expressed in mm/s and the laser beam power P expressed in W, was comprised, at each selective melting step E2, between 15 and 24.

It has also been noticed that for the disk-like shaped functional parts 10 with a diameter of 60 mm, these had undulations from the mid-height thereof, probably due to marking problems and/or problems of holding by the supports 24 and/or of residual stresses.

Test 4

This test 4 was intended to identify the value triplets of the parameters P, V and HD allowing obtaining the expected filtering criteria in terms of permeability to air and to the liquid and in terms of efficiency at different particle sizes.

This test 4 consisted in manufacturing disk-like shaped functional parts 10 having a diameter of 96 mm, 8 of them having a thickness of 0.6 mm and the remaining 20 having a thickness of 1 mm, the angle formed between the support tray 18 and each functional part 10 being 90° within a 5° margin. The thickness e of each deposited material layer was 50 μm.

FIG. 10 represents, for the manufactured functional parts 10 manufactured in this manner, the respective value that has been used for P, V, HD, e, E.

In particular, for a power density E equal to 13 J/mm$^3$, at the level of the manufacture of the filtering medium 12, the ratio between the displacement velocity V expressed in mm/s and the laser beam power P expressed in W, is comprised, at each selective melting step E2, between 15 and 24.

It has been noticed that if all functional parts 10 have been manufactured at least partially during the test 4, all of them featured many deformations. The functional parts 10 having a thickness of 0.6 mm could not be completely manufactured as, because of their too thin thickness in comparison with their diameter, deformations and undulations appear starting from a few centimeters considered from the support tray 18. The same problem appeared for the functional parts 10 whose thickness is 1 mm, even though this is less pronounced.

Test 5

This test 5 has been conducted in order to address the problems of deformations and undulations that have appeared in the test 4.

To this end, the functional parts 10 to be manufactured have been modified so as to have a reinforcing contour 26. More specifically, the main phase P1 has been parameterized so that the functional part 10 resulting from the main phase P1 comprises this reinforcing contour 26 arranged over all or part of the peripheral border of the filtering medium 12, that is to say in the particular case of a disk-like shaped filtering medium 12 as has been the case in the test 4, over the peripheral border of this disk.

Figure 13:
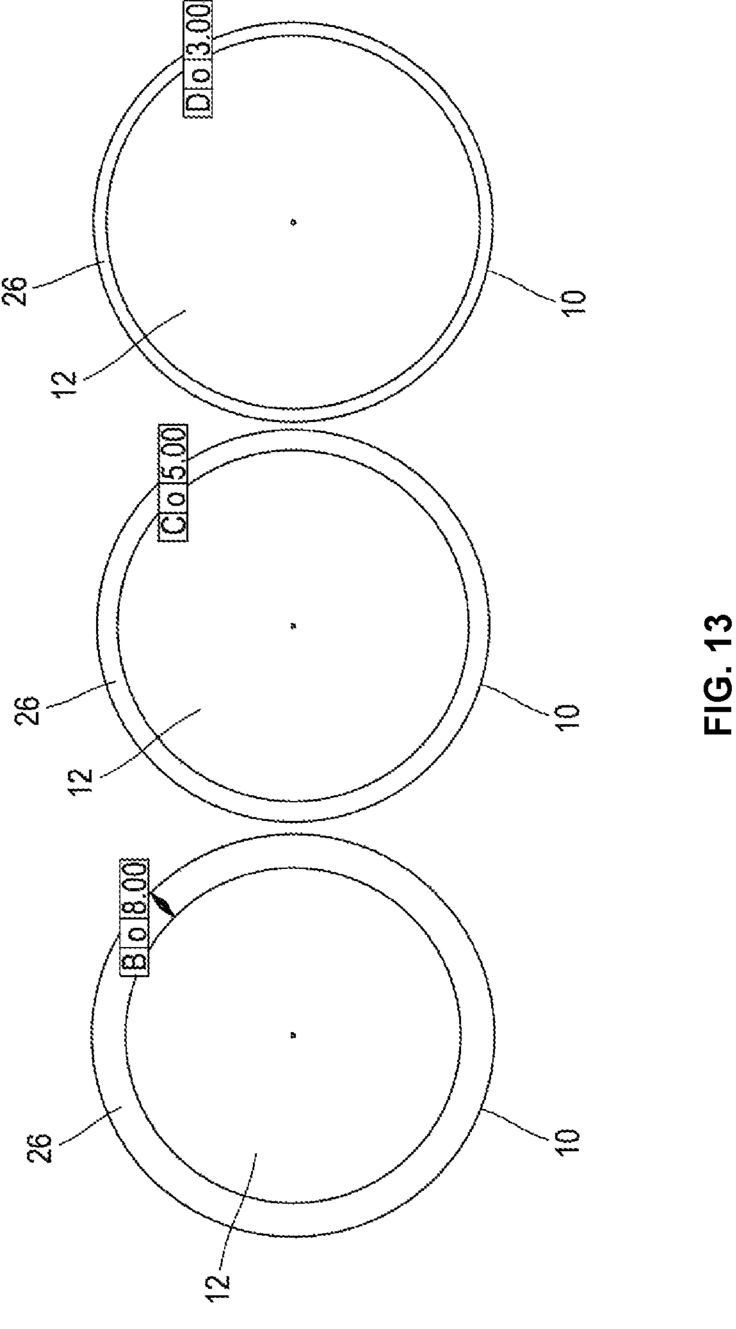
FIG. 13 represents three configurations of functional parts 10 manufactured in the test 5, with reinforcing contours having different widths from one configuration to another.

In this test, and with reference to FIG. 13, some functional parts 10 had a disk-like shaped filtering medium 12 having a thickness of 0.6 mm and the reinforcing contour 26 has, in the plane of the first main face 14 and/or of the second main face 16, a width of 8 mm. Other functional parts 10 had a disk-like shaped filtering medium 12 having a thickness of 1 mm and the reinforcing contour 26 has, in the plane of the first main face 14 and/or of the second main face 16, a width of 5 mm. Still other functional parts 10 had a disk-like shaped filtering medium 12 having a thickness of 1.5 mm and the reinforcing contour 26 has, in the plane of the first main face 14 and/or of the second main face 16, a width of 3 mm.

The used parameters were such that at the level of the manufactured reinforcing contour 26, the porosity rate was equal to 0, for example by providing for a power P equal to 100 W and a velocity V equal to 300 mm/s. Hence, the reinforcing contour 26 was much denser than at the level of the filtering medium 12. More generally, the laser beam power density E is equal to 13 J/mm$^3$, and at the level of the manufacture of the reinforcing contour 26, the ratio between the displacement velocity V expressed in mm/s and the laser beam power P expressed in W, was comprised, at each selective melting step E2, between 2.5 and 3.5.

FIG. 11 represents, for the manufactured functional parts 10 manufactured in this manner, the respective value that has been used for P, V, HD, e, E at the level of the filtering medium 12. In particular, for a power density E equal to 13 J/mm$^3$, at the level of the manufacture of the filtering medium 12, the ratio between the displacement velocity V expressed in mm/s and the laser beam power P expressed in W, is comprised, at each selective melting step E2, between 15 and 24.

The parameters used for the manufacture of the supports 24 were identical to those used in the test 4.

It was possible to notice the presence of a detachment in the form of an absence of contact between the reinforcing contour 26 and the filtering medium 12 on some areas.

On the contrary, it was possible to notice that the undulations were substantially less pronounced and/or appeared at a higher height than is the case in the test 4 because of the presence of the reinforcing contour 26. Only the functional parts 10 having a thickness of 1.5 mm featured almost no deformation, and that being so irrespective of the used parameters.

Test 6

This test 6 replicated the test 5 while keeping only the functional parts 10 with a thickness of 1 millimeter and functional parts 10 manufactured with other combinations of parameters.

FIG. 12 represents, for the manufactured functional parts 10, the respective value that has been used for P, V, HD, e, E at the level of the filtering medium 12.

The parameters used for the manufacture of the supports 24 were different from those used in the test 5. In the test 5, each support 24 comprised a set of connecting lines connecting the supported functional part 10 and the support tray 18. In the test 6, each support 24 was in the form of a block.

Moreover, in order to address the problems of detachments between the reinforcing contour 26 and the filtering medium 12 that appeared in the test 5, the reinforcing contour 26 had, in the plane of the first main face 14 and/or of the second main face 16, an overlap with the filtering medium 12 having a width of 0.4 mm.

Thanks to the presence of the 0.4 mm overlap between the reinforcing contour 26 and the filtering medium 12, no detachment between these two portions has appeared. Nonetheless, deformations were still present.

Moreover, because of the modification of the shape of the supports 24, the undulations of the filtering media 12 have been considerably reduced and appear at a substantially higher height (considered starting from the tray 18). Consequently, the functional parts 10 still lack stability during manufacture, but much lesser than is the case in the test 5.

Finally, the filtering media 12 manufactured using a P value equal to 275 W, a HD value equal to 0.2 mm and a velocity V equal to 3501 mm/s had the best visual appearance, although the filtering medium had a strong tendency to tear.

Test 7

In this test 7, different parameters for the supports 24 have been tested, while keeping a laser beam power P of 275 W, a displacement velocity V of 2000 mm/s and a HD value of 0.12 μm. In addition, different configurations of supports 24 have been tested, by switching between a block shape and a tree-like shape with lateral support strands supporting the functional part 10 at a given height of the latter, and not only in its lower portion. For some block-shaped supports 24, the block has been reinforced at its periphery by an increase of its thickness to a value of 0.7 mm whereas at the center the thickness was 0.5 mm.

In addition, the reinforcing contour 26 had, in the plane of the first main face 14 and/or of the second main face 16, an overlap with the filtering medium 12 having a width of 2 mm, and therefore larger than that of the overlap present in the test 6.

In this test 7, it has also been studied, for a diameter of the manufactured disks equal to 96 mm, the influence of the face of making the HD value vary between 120, 150, 180 and 200 μm, for a thickness of the filtering medium 12 equal to 1.5 mm.

Finally, disk-like shaped functional parts 10 whose diameter was equal to 50 mm have been manufactured, while making the value of the rotation parameter vary between 5° and 90° with a «Limitation window» of 90°.

Thus, it has been noticed that the porosity rate of the pores within the filtering medium 12 could be adjusted, for a given laser beam power P and a given layer thickness e, by adapting the offset value HD, the porosity rate increasing as the offset value HD increases.

As regards the rotation parameter with a «Limitation window» of 90°, the porosity rate was constant while remaining comprised between 35% and 36%, except for a rotation value of 5° and 66° where the porosity rate was higher, then becoming comprised between 39% and 40%.

Moreover, it has been determined that the presence of tree-like shaped supports 24 was superfluous in comparison with the supports 24 in the form of blocks reinforced at the periphery.

Finally, the presence of an overlap having a width of 1 mm within a 10% margin is particularly advantageous to avoid deformations.

Test 8

This test 8 was identical to the test 7, except that the supports 24 in the form of a block with a thickness of 0.5 mm and reinforced at the periphery by an increase in the thickness to 0.7 mm, have been replaced with supports 24 in the form of a block with a thickness of 0.4 mm and reinforced at the periphery by an increase of the thickness to 0.6 mm.

It has been noticed that the manufactured functional parts 10 featured deformations over their top portion, which has not been the case in the test 7. Thus, the supports 24 turned out to have mechanical strength to withstand the functional parts 10 manufactured on top of them.

The invention claimed is:

1. A manufacturing method enabling obtainment of a functional part essentially formed in a metallic material, all or part of the functional part delimiting a filtering medium permeable to a fluid and delimiting first and second main faces for a circulation of a gas through the filtering medium between the first and second main faces, the manufacturing method comprising a main phase consisting of an additive manufacturing method in successive passes from a support tray, each pass comprising a deposition of at least one layer of the metallic material, the deposited material adhering to the metallic material of at least one layer deposited before, the deposition of the metallic material at a level of each layer being controlled at each pass such that a stack of the metallic material deposited during the successive passes constitutes the functional part, whose filtering medium comprises a coalescent network of connecting strands interconnected according to a three-dimensional spatial distribution between the first and second main faces, the connecting strands of the network delimiting therebetween pores spatially distributed within the filtering medium in three dimensions between the first and second main faces, wherein each pass comprises a step of depositing at least one powder layer formed in the metallic material and then a step of selective melting of the powder deposited before through a local energy input by action of a laser beam, the selective melting of the powder being controlled using a pre-established computer database, which computer database controls at each pass, by a computer program controlling a spatial displacement of the laser beam relative to the powder deposited before, at least one of a parameter selected amongst: a relative path between the laser beam and the powder deposited before, a displacement velocity corresponding to a relative velocity between the laser beam and the powder deposited before, a laser beam power, a laser beam power density, wherein at each selective melting step, a porosity rate of the pores within the filtering medium is adjusted, for a given laser beam power and a given layer thickness, by adapting the laser beam power density and adapting the displacement velocity, the porosity rate increasing below an upper threshold of the laser beam power density, as the laser beam power density decreases and the porosity rate increasing above a lower threshold of the displacement velocity, as the displacement velocity increases, wherein the given laser beam power is 275 W and the given layer thickness is 50 μm, the upper threshold of the power density being comprised between 7 and 20 $J/mm^3$ and the lower threshold of the displacement velocity being comprised between 1500 and 6000 mm/s.

2. A functional part obtained by implementing a manufacturing method according to claim 1.

3. The functional part according to claim 2, wherein the network of connecting strands and the pores present in the filtering medium are such that for the fluid crossing the filtering medium in a direction from the first main face towards the second main face or in a direction from the second main face towards the first main face, the permeability is comprised between 11 and 200 $l \cdot m^{-2} \cdot s^{-1}$ for a pressure drop between the first and second main faces of 100 Pa.

4. The functional part according to claim 2, wherein at a level of the filtering medium, the porosity rate of the pores present in the filtering medium is comprised between 10% and 70%.

5. The functional part according to claim 2, wherein the filtering medium is intended to be used as a filtering mask, having a thickness, considered between the first and second main faces, comprised between 600 μm and 2 mm.

6. The functional part according to claim 5, whose filtering medium has a disk-like general shape, in the form of a planar surface or a clumsy surface, the disk having a diameter comprised between 8 mm and 120 mm.

7. The manufacturing method according to claim 1, wherein the main phase is parameterized so that the functional part derived from the main phase comprises a reinforcing contour arranged over all or part of a peripheral border of the filtering medium.

8. The manufacturing method according to claim 7, wherein the reinforcing contour has, in a plane of the first main face and/or of the second main face, an overlap with the filtering medium.

9. The manufacturing method according to claim 7, wherein at a level of the manufactured reinforcing contour, the porosity rate is equal to 0.

10. The manufacturing method according to claim 1, wherein the filtering medium obtained during the main phase is contained in a main plane forming an angle comprised between 30° and 90° with the support tray.

11. The manufacturing method according to claim 1, wherein a thickness of the filtering medium, considered between the first and second main faces, is comprised between 400 μm and 500 mm.

12. The manufacturing method according to claim 1, wherein the metallic material in which the functional part is essentially made comprises at least one of the following material in a pure form, in alloy form or in oxide form: aluminum, stainless steel, nickel, cobalt, iron, copper, palladium, titanium, tungsten, silver, platinum.

13. The manufacturing method according to claim 1, wherein at each pass, the support tray is heated up to a temperature comprised between the ambient temperature and 250° C. within a 10% margin.

14. The manufacturing method according to claim 1 wherein each powder layer has a thickness comprised between 20 μm and 100 μm.

15. The manufacturing method according to claim 1 wherein the laser beam power used at each pass during the selective melting step, at a level of the filtering medium, is comprised between 30% and 90% of a laser beam power value enabling obtainment of a non-porous block devoid of pores formed in the metallic material.

16. The manufacturing method according to claim 1, wherein the main phase is parameterized so that the functional part derived from the main phase comprises a reinforcing contour arranged over all or part of a peripheral border of the filtering medium; and wherein the laser beam power density is equal to 13 $J/mm^3$, and wherein at a level of the manufacture of the reinforcing contour, a ratio between the displacement velocity expressed in mm/s and the laser beam power expressed in W, is comprised, at each selective melting step, between 2.5 and 3.5.

17. The manufacturing method according to claim 1, wherein the main phase is parameterized so that the functional part is connected to a support plate by a support formed in the same metallic material as the functional part and obtained by the same additive manufacturing method as the functional part.

18. The manufacturing method according to claim 1, wherein at each selective melting step, a path followed by the laser beam comprises displacement vectors where the displacement vectors are spatially offset in pairs according to an offset value and wherein a porosity rate of the pores within the filtering medium is adjusted, for a given laser beam power and a given layer thickness, by adapting the offset value, the porosity rate increasing as the offset value increases.

19. The manufacturing method according to claim 1, wherein the metallic material is formed of 316L stainless steel powder and the gas is argon.

* * * * *